US008005198B2

(12) United States Patent
Baird et al.

(10) Patent No.: US 8,005,198 B2
(45) Date of Patent: Aug. 23, 2011

(54) METHODS AND APPARATUS FOR DEFENDING AGAINST TELEPHONE-BASED ROBOTIC ATTACKS USING PERMUTATION OF AN IVR MENU

(75) Inventors: Henry Baird, Bethlehem, PA (US); Jon Bentley, New Providence, NJ (US); Daniel Lopresti, Hellertown, PA (US); Sui-Yu Wang, Bethlehem, PA (US)

(73) Assignee: Avaya Inc., Basking Ridge, NJ (US)

( * ) Notice: Subject to any disclaimer, the term of this patent is extended or adjusted under 35 U.S.C. 154(b) by 999 days.

(21) Appl. No.: 11/770,944

(22) Filed: Jun. 29, 2007

(65) Prior Publication Data

US 2009/0003549 A1 Jan. 1, 2009

(51) Int. Cl.
*H04M 1/64* (2006.01)
*G10L 21/00* (2006.01)

(52) U.S. Cl. ................................ 379/88.23; 379/93.01

(58) Field of Classification Search ............... 379/88.04, 379/127.02, 144.03, 243; 704/270.1; 706/52
See application file for complete search history.

(56) References Cited

U.S. PATENT DOCUMENTS

| 7,003,079 | B1* | 2/2006 | McCarthy et al. | 379/32.01 |
| 7,003,083 | B2 | 2/2006 | Kovales et al. | |
| 7,062,437 | B2 | 6/2006 | Kovales et al. | |
| 7,065,188 | B1* | 6/2006 | Mei et al. | 379/88.23 |
| 7,143,039 | B1 | 11/2006 | Stifelman et al. | |
| 7,356,130 | B2 | 4/2008 | Agapi et al. | |
| 7,424,098 | B2 | 9/2008 | Kovales et al. | |
| 7,436,939 | B1 | 10/2008 | Packingham et al. | |
| 7,457,395 | B2* | 11/2008 | Creamer et al. | 379/88.01 |
| 7,606,718 | B2 | 10/2009 | Cloran | |
| 7,653,188 | B2* | 1/2010 | Kloberdans et al. | 379/145 |
| 7,773,731 | B2* | 8/2010 | Malik et al. | 379/88.22 |
| 7,805,310 | B2* | 9/2010 | Rohwer | 704/270.1 |
| 2001/0014146 | A1* | 8/2001 | Beyda et al. | 379/88.25 |
| 2002/0154749 | A1 | 10/2002 | Conn et al. | |
| 2003/0161449 | A1* | 8/2003 | Plan | 379/88.18 |
| 2004/0107108 | A1* | 6/2004 | Rohwer | 704/275 |
| 2004/0128353 | A1 | 7/2004 | Goodman et al. | |
| 2004/0240635 | A1* | 12/2004 | Bushey et al. | 379/88.16 |
| 2005/0169440 | A1 | 8/2005 | Agapi et al. | |
| 2005/0246775 | A1 | 11/2005 | Chellapilla et al. | |

(Continued)

OTHER PUBLICATIONS

Islam, Mohammad K., "U.S. Appl. No. 11/770,938 Office Action Dec. 10, 2010",, Publisher: USPTO, Published in: US.

(Continued)

*Primary Examiner* — Davetta W Goins
*Assistant Examiner* — Mohammad Islam
(74) *Attorney, Agent, or Firm* — Joseph B. Ryan; Jason Paul DeMont; Wayne S. Breyer

(57) ABSTRACT

Methods and apparatus are provided for defending against telephone-based robotic attacks An interactive voice response method is provided for presenting a menu having one or more menu options to a caller. The method comprises the steps of obtaining a script to present to the caller, the script including the one or more menu options; permuting one or more characteristics of at least one of the one or more menu options; and presenting the permuted menu to the caller. The permutation may comprise, for example, adding one or more additional menu options to the menu; varying a selection number associated with the at least one menu option; varying an order of at least a plurality of the menu options; or varying a wording or pronunciation of one or more menu options.

17 Claims, 7 Drawing Sheets

U.S. PATENT DOCUMENTS

| | | |
|---|---|---|
| 2006/0122834 A1* | 6/2006 | Bennett .......................... 704/256 |
| 2006/0165102 A1* | 7/2006 | Franz et al. .................... 370/401 |
| 2006/0282864 A1 | 12/2006 | Gupte |
| 2007/0036314 A1* | 2/2007 | Kloberdans et al. .......... 379/189 |
| 2007/0116200 A1 | 5/2007 | Hewitt et al. |
| 2007/0133759 A1* | 6/2007 | Malik et al. ..................... 379/80 |
| 2007/0280456 A1* | 12/2007 | Vadlakonda et al. .... 379/201.01 |
| 2008/0040754 A1 | 2/2008 | Lai |
| 2008/0044048 A1* | 2/2008 | Pentland ....................... 381/315 |
| 2010/0158219 A1 | 6/2010 | Dhawan et al. |
| 2010/0183126 A1 | 7/2010 | Chambers et al. |
| 2010/0241564 A1 | 9/2010 | Miller et al. |
| 2010/0284522 A1* | 11/2010 | Jaiswal et al. ............. 379/88.04 |

OTHER PUBLICATIONS

Islam, Mohammad K., "U.S. Appl. No. 11/770,935 Office Action Jan. 6, 2011" Publisher: USPTO, Published in: US.

Islam, Mohammad K., "U.S. Appl. No. 11/770,938 Notice of Allowance Mar. 18, 2011",, Publisher: USPTO, Published in: US.

Islam, Mohammad K., "U.S. Appl. No. 11/770,935 Notice of Allowance Mar. 18, 2011",, Publisher: USPTO, Published in: US.

Islam, Mohammad K., "U.S. Appl. No. 11/770,935 Examiner's Amendment Mar. 31, 2011",, Publisher: USPTO, Published in: US.

Islam, Mohammad K., "U.S. Appl. No. 11/770,938 dated Jun. 2, 2011", Publisher: USPTO, Published in: US.

* cited by examiner

```
START:
WELCOME TO FICTITIOUS AIRLINES.
1. PRESS 1 TO TRACK A CURRENT FLIGHT. [TRACK]
2. PRESS 2 TO MAKE A DOMESTIC RESERVATION. [DOMESTIC]
3. PRESS 3 TO MAKE AN INTERNATIONAL RESERVATION. [INTERNATIONAL]
4. PRESS 4 FOR ALL OTHER REQUESTS. [OTHER]
5. TO HEAR THESE OPTIONS AGAIN, PRESS 5. [START]

TRACK:
WELCOME TO FICTITIOUS AIRLINES FLIGHT TRACKER.
1. IF YOU KNOW THE NUMBER OF THE FLIGHT YOU WANT TO TRACK, PRESS 1
   NOW. [TRACK_NUMBER]
2. IF YOU KNOW THE CITY FROM WHICH THE FLIGHT DEPARTED, PRESS 2 NOW.
   [TRACK_DEPARTURE]
...
```

410 braces lines 1–5 of START section.
420 braces lines 1–2 of TRACK section.

```
START:
WELCOME TO FICTITIOUS AIRLINES.
* PRESS _ TO TRACK A CURRENT FLIGHT. [TRACK]
* PRESS _ TO MAKE A DOMESTIC RESERVATION. [DOMESTIC]
* PRESS _ TO MAKE AN INTERNATIONAL RESERVATION. [INTERNATIONAL]
* PRESS _ FOR ALL OTHER REQUESTS. [OTHER]
* TO HEAR THESE OPTIONS AGAIN, PRESS _. [START]
```

```
START:
WELCOME TO FICTITIOUS AIRLINES.
* PRESS _ TO MAKE AN INTERNATIONAL RESERVATION.
  [INTERNATIONAL]
* PRESS _ TO MAKE A DOMESTIC RESERVATION.
  [DOMESTIC]
* PRESS _ TO TRACK A CURRENT FLIGHT. [TRACK]
*-2 PRESS _ FOR ALL OTHER REQUESTS. [OTHER]
*-1  TO HEAR THESE OPTIONS AGAIN, PRESS _.
  [START]
```

610 — first three lines
620 — last two lines

```
START:
WELCOME TO FICTITIOUS AIRLINES.
4 PRESS _ TO MAKE AN INTERNATIONAL RESERVATION.
  [INTERNATIONAL]
7 PRESS _ TO MAKE A DOMESTIC RESERVATION.
  [DOMESTIC]
1 PRESS _ TO TRACK A CURRENT FLIGHT. [TRACK]
9 PRESS _ FOR ALL OTHER REQUESTS. [OTHER]
2 TO HEAR THESE OPTIONS AGAIN, PRESS _.
  [START]
```

BUSINESS ORIENTED
- \* PRESS _ FOR INFORMATION ABOUT HOTEL RESERVATIONS.
- \* PRESS _ TO LEARN ABOUT OUR CREDIT CARD.   (810)
- \* PRESS _ TO TAKE OUR CUSTOMER SATISFACTION SURVEY.

OTHER
- \* PRESS _ TO HEAR A DUCK QUACK.
- \* PRESS _ FOR OUR JOKE OF THE DAY.   (820)

EXAMPLE
   \*[PRESS _ TO MAKE AN INTERNATIONAL RESERVATION.
    | TO MAKE AN INTERNATIONAL RESERVATION, PRESS _.
    | TO RESERVE A FLIGHT OUTSIDE THE US, PRESS _.
    | FOR INTERNATIONAL FLIGHTS, PRESS _.
    ]
SELECT ONE PHRASE AT RANDOM

```
EXAMPLE GRAMMAR
    SENTENCE → ACTION CONSEQUENCE | CONSEQUENCE, ACTION.
    ACTION → PRESS _ | PRESS THE _ KEY | PUSH _
    CONSEQUENCE → FOR INTERNATIONAL FLIGHTS |
        TO RESERVE A FLIGHT OUTSIDE THE US |
        TO MAKE AN INTERNATIONAL RESERVATION
```

```
CONVERT TO MODIFIED FORM
SELECT RANDOM PHRASINGS (FIG. 9)
ADD CHOICES (FIG. 8)
SHUFFLE (FIG. 6)
RENUMBER (FIG. 7)
RANDOMLY PRONOUNCE
```

METHODS AND APPARATUS FOR DEFENDING AGAINST TELEPHONE-BASED ROBOTIC ATTACKS USING PERMUTATION OF AN IVR MENU

CROSS-REFERENCE TO RELATED APPLICATIONS

The present invention relates to U.S. patent application Ser. No. 11/770,938, entitled, "Methods and Apparatus for Defending Against Telephone-Based Robotic Attacks Using Random Personal Codes," and U.S. patent application Ser. No 11/770,935, entitled, "Methods and Apparatus for Defending Against Telephone-Based Robotic Attacks Using Contextual-Based Degradation," each filed contemporaneously herewith and incorporated by reference herein.

FIELD OF THE INVENTION

The present invention relates generally to interactive voice response techniques, and more particularly, to implicit techniques for defending against robotic attacks in an interactive voice response system.

BACKGROUND OF THE INVENTION

Interactive voice response (IVR) systems allow a computer to detect and process the speech or touch tones entered by a caller. The IVR system can respond with pre-recorded or dynamically generated messages to further direct the caller. IVR systems are often employed when the caller interface can be presented as a number of menu choices The collection of menu choices associated with an IVR system is often referred to as an IVR tree In practice, a caller typically calls a desired telephone number that is answered by an IVR system The IVR system plays a message and prompts the caller to select an option from a menu of options The caller can typically press a number associated with a desired menu option on a telephone keypad or state the selected number. For example, the pre-recorded message may prompt the user to "say or press 1 for yes, or say or press 2 for no " Speech recognition is typically employed to interpret the caller's spoken answers in response to the voice prompt.

In such an IVR environment, mechanical agents (or "robots") often attempt to place undesired telephone calls to the IVR system The robots typically aim to traverse the IVR menu to reach a human agent (and thereby waste a valuable resource), or to reach another limited resources, such as a bank account or other stored data. In an IVR or another telephony domain, spam (i.e., unsolicited or undesired bulk electronic messages) is often referred to as "Spam over Internet Telephony" ("SPIT") and is a problem for both traditional and Voice Over Internet Protocol (VoIP) telephony services The undesired telephone calls can include, for example, advertising or political messages, interruptions (sometimes referred to as "ring and run"), or denial of service (DoS) attacks. Denial of Service attacks, for example, can overload voice servers and affect system reliability. Robot attacks against telephones could be directed at IVR systems or against humans in real time or via voice mail or facsimile. In addition, robot attacks can be directed at other limited resources, such as bank accounts or other stored data.

A number of techniques exist for distinguishing between human and computer users, often referred to as "Completely Automated Public Test to tell Computers and Humans Apart," or "CAPICHA." CAPICHAs are commonly used on web sites such as those selling event tickets or offering free e-mail services An image file that contains a degraded picture of a word is typically displayed, and the user must type in the characters in the image. Such images are generally tuned to be beyond the capability of mechanical optical character recognition (OCR) systems, but within the capability of most human users.

In the telephone domain, Telephone CAPICHAs (or TCAPICHAs) have been used to present a user with an audio message (typically a sequence of digits) that has been degraded beyond the capability of speech recognition systems. The caller must enter (or speak) the digit sequence to establish that he or she is a human user. Generally, robots do not have sufficient speech recognition capabilities and will thus fail the tests In this manner; robots will waste time in an IVR system (and thereby be discouraged from attacking the protected system), while human users will navigate them easily to their desired tasks The degradation is accomplished, for example, by techniques that add background noise, such as white noise; or other degradations, such as echoes or the simulation of packet loss. The resulting sounds ale difficult for machines to recognize, yet ate typically easily recognized by human users. The resulting sounds, however, are typically unnatural and potentially irritating to human users. These tests are typically applied at a portal before a user is given access to a system.

A need therefore exists for improved techniques for defending against telephone-based robotic attacks.

SUMMARY OF THE INVENTION

Generally, methods and apparatus are provided for defending against telephone-based robotic attacks. According to one aspect of the invention, an interactive voice response method is provided for presenting a menu having one or more menu options to a caller The method comprises the steps of obtaining a script to present to the caller, the script including the one or more menu options; permuting one or more characteristics of at least one of the one or more menu options; and presenting the permuted menu to the caller.

The permutation may comprise, for example, adding one or more additional menu options to the menu; varying a selection number associated with the at least one menu option; varying an order of at least a plurality of the menu options; or varying a wording or pronunciation of one or more menu options In one variation, a security level provided by the disclose method can be quantified using probabilistic techniques.

A more complete understanding of the present invention, as well as further features and advantages of the present invention, will be obtained by reference to the following detailed description and drawings.

BRIEF DESCRIPTION OF THE DRAWINGS

FIG. 4 illustrates an exemplary representation of a conventional IVR tree;

FIG. 5 illustrates an exemplary representation of a permutable IVR tree incorporating features of the present invention;

FIG. 6 illustrates an exemplary representation of a permutable IVR tree in accordance with a shuffling embodiment of the present invention;

FIG. 7 illustrates an exemplary representation of a permutable IVR tree in accordance with a renumbering embodiment of the present invention;

FIG. 8 illustrates an exemplary catalog of additional menu options for a permutable IVR tree in accordance with the present invention;

FIG. 9 illustrates an exemplary catalog of alternate phrases fox one or more menu options for a permutable IVR tree in accordance with an "alternate phrasing" embodiment of the present invention;

FIG. 10 illustrates an exemplary grammar for such dynamic generation of sentences by the alternate phrasing embodiment of FIG. 9; and FIG. 11 illustrates an exemplary outline for an integrated embodiment that incorporates several of the embodiments of the present invention.

DETAILED DESCRIPTION

The present invention provides methods and apparatus for defending against telephone-based robotic attacks using the permutation of an IVR menu As used herein, an IVR system comprises any device capable of providing a message to a user and to process the entered or spoken response of the caller For example, an IVR system can include a voice mail system, a voice mail system behind a Private Branch Exchange (PBX) switch, ox a personal answering machine. The sequence at each node in an IVR tree can be randomly permuted for each call. In various embodiments of the present invention, an IVR menu is permuted to thwart the robotic attacks and increase the security of the IVR system. For example, as discussed further below in conjunction with FIGS. 5 through 11, the IVR menu options can be permuted or changed over time by adding additional menu options, varying the selection number associated with one or more menu options or varying one or more of the order, wording and pronunciation of the menu options.

Figure 1:
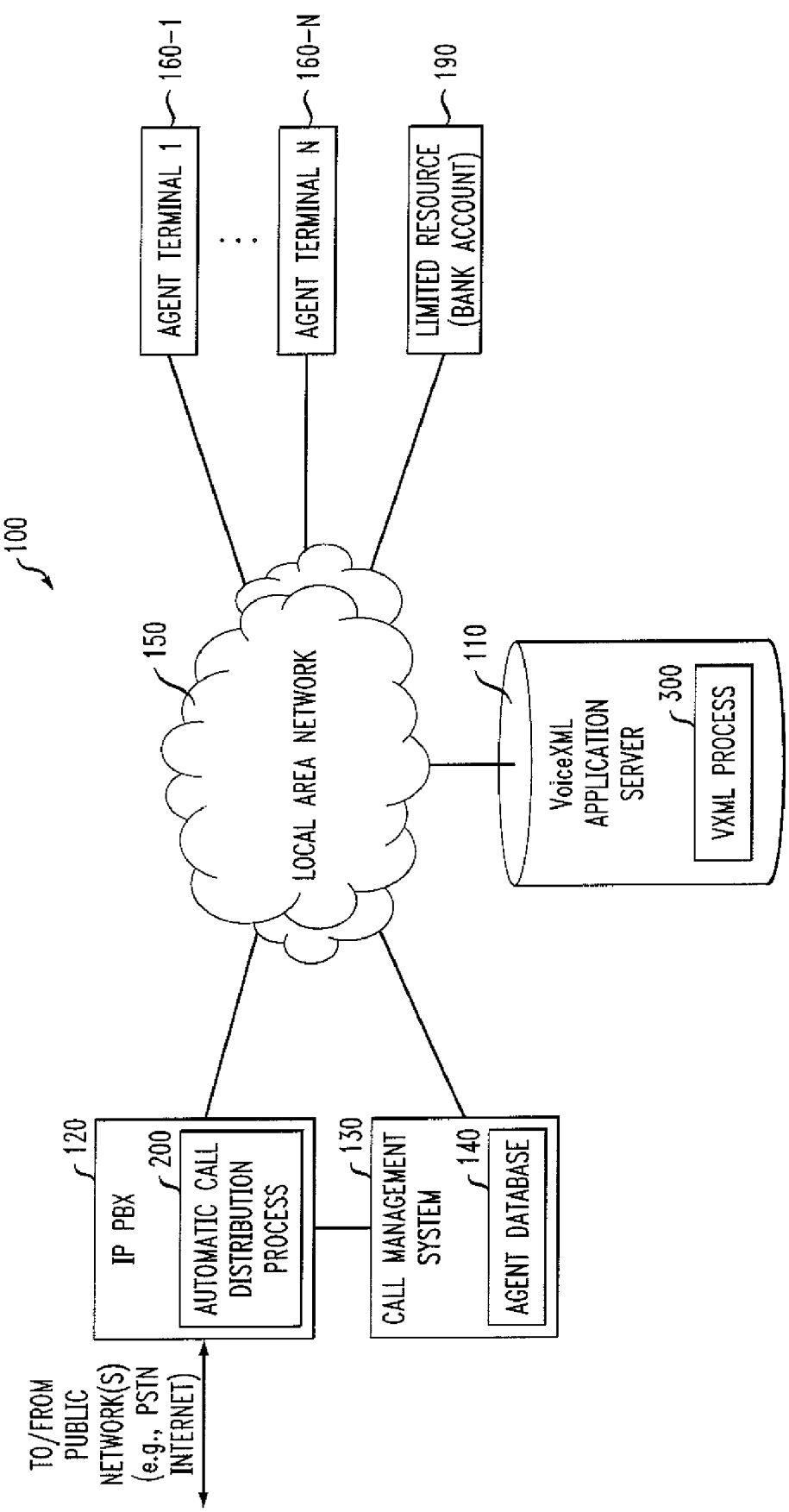
FIG. 1 illustrates an exemplary IVR system in which the present invention can operate.

FIG. 1 illustrates an exemplary IVR system 100 in which the present invention can operate As shown in FIG. 1, the IVR system 100 includes a voiceXML application server 110, an Internet Protocol (IP) private branch exchange (PBX) 120, a call management system 130, one or more agent terminals 160-1 through 160-N (hereinafter, collectively referred to as agent terminals 160) and optionally one or more additional limited resources 190, such as a bank account, interconnected by a local area network (LAN) 150

The IVR application (including the IVR scripts) may be written, for example, in VoiceXML (VXML) and stored on the central VoiceXML application server 110. The VoiceXML application server 110 may be embodied, for example, as a Microsoft Web server with Internet Information Services (IIS) package installed and enabled, commercially available from Microsoft Corp. of Redmond, Wash., as modified herein to carry out the features and functions of the present invention. It is noted, however, that while the exemplary embodiment employs voiceXML, other techniques that provide HTML-based support for IVR, such as Speech Application Language Tags (SALT), described, for example, in Speech Application Language Tags (SALT), Technical White Paper, downloadable from www.saltforum.org, could be employed, as would be apparent to a person of ordinary skill in the art, based on the disclosure herein.

The IP PBX 120 includes an automatic call distribution process 200, discussed below in conjunction with FIG. 2, that manages the IVR resources. Generally, the automatic call distribution process 200 monitors the availability status of all IVR agents in the IVR system 100 using an agent database 140, and distributes telephone calls and other types of communications to the appropriate agents. The IP PBX 120 can provide information to the call management system 130 regarding the availability of individual agents and other call center statistics, for the generation of appropriate reports and forecasts.

The call management system 130 may be embodied, for example, as the Call Management System®, commercially available from Avaya Inc. of Basking Ridge, N.J., as modified herein to carry out the features and functions of the present invention. The IP PBX 120 may be embodied, for example, as the IP 600 Internet Protocol Communications Server, commercially available from Avaya Inc of Basking Ridge, N.J., as modified herein to carry out the features and functions of the present invention.

The IVR capabilities of a given agent terminal 160 appear to the automatic call distribution process 200 as an agent logged onto an instance of a desktop telephone at the corresponding agent terminal 160 When a call is received at the IVR system 100, the call is routed using well-known techniques to the IVR extension on the agent terminal 160 and a remote IVR process can handle the call. The agent terminals 160 can be embodied as any computing system having a processor and memory configured to perform the disclosed features and functions of the present invention, such as a personal computer, workstation or personal digital assistant.

Figure 2:
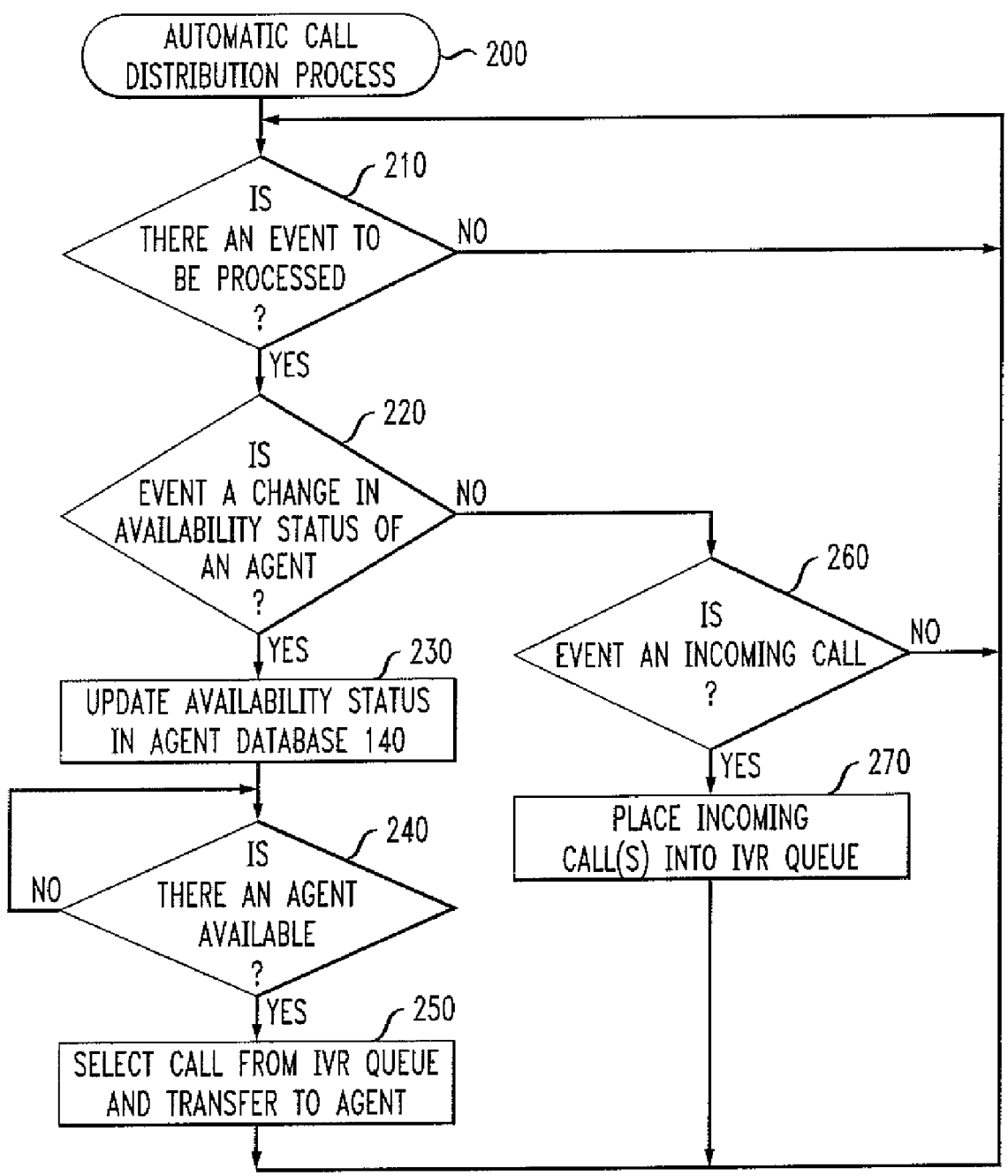
FIG. 2 is a flow chart describing an exemplary implementation of the automatic call distribution process of FIG. 1.

FIG. 2 is a flow chart describing an exemplary implementation of the automatic call distribution process 200. As previously indicated, the automatic call distribution process 200 employs an agent database 140, to record the availability status of each agent in the IVR system 100 For each agent, the agent database 140 includes, for example, the extension address of the agent, an indication of any special skills of the agent, and an indication of the availability of the agent.

The automatic call distribution process 200 manages the IVR resources by monitoring the availability status of the IVR agents 160 and distributing telephone calls and other types of communications to the appropriate agents. The automatic call distribution process 200 places calls into an IVR queue as with conventional centralized server systems As discussed hereinafter, whenever an IVR agent becomes available, a call is selected from the waiting queue and presented to the agent A record of each call started and each call completed can be made to the call management system 130 for inclusion in status and historical reports.

As shown in FIG. 2, the automatic call distribution process 200 initially performs a test during step 210 to determine if an event is detected. If it is determined during step 210 that an event is not detected, then program control returns to step 210 until an event to be processed is detected. Once it is determined during step 210 that an event is detected, then program control proceeds to step 220 where a further test is performed during step 220 to determine if event is a change in the availability status of an agent. If it is determined during step 220 that there is no change in the availability status of an agent, then program control proceeds to step 260, discussed below. If, however, it is determined during step 220 that there is a change in the availability status of an agent, then the availability status is updated in the agent database 140 during step 230.

A further test is per formed during step 240 to determine if an agent is available. If it is determined during step 240 that an agent is not available, then program control returns to step 240 until an available agent is detected. If, however, it is determined during step 240 that an agent is available, then a call is selected from the IVR queue and transferred to the available agent during step 250.

If it is determined during step 220 that there is no change in the availability status of an agent, then a further test is performed during step 260 to determine if the event is an incoming call If it is determined during step 260 that the event is not an incoming call, then program control returns to step 210 and continues in the manner described above If it is determined during step 260 that the event is an incoming call, then all incoming calls awe placed into an IVR queue (not shown) during step 270, in a known manner. Program control then terminates or returns to step 210 for continued monitoring of changes in the availability status of agents and distributing telephone calls and other types of communications to the appropriate agents.

Figure 3:
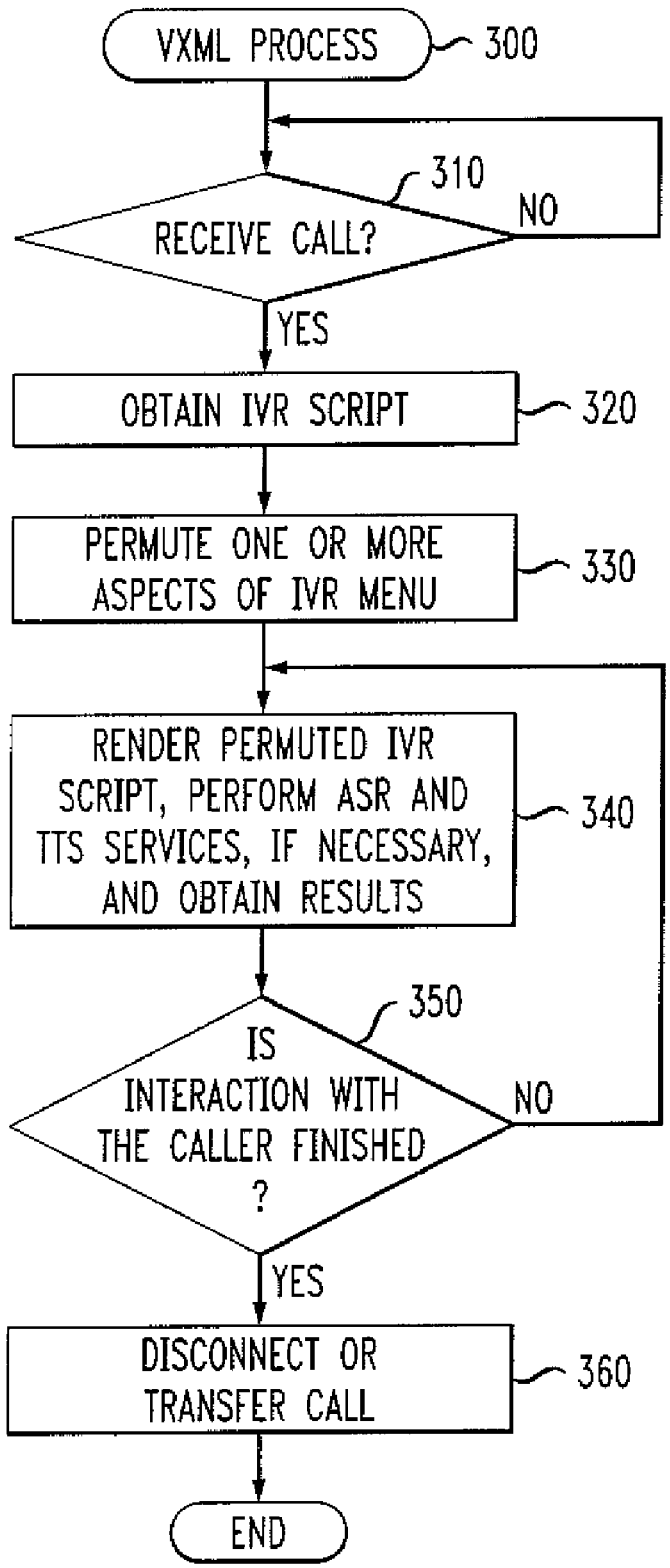
FIG. 3 is a flow chart describing an exemplary implementation of a VXML process incorporating features of the present invention.

FIG. 3 is a flow chart describing an exemplary implementation of a VXML process 300 incorporating features of the present invention. It is noted that the VXML process 300 of FIG. 3 can be used to process all received calls or optionally the VXML process 300 can be implemented to only be operational when the IVR system 100 is under attack Although the VXML process 300 is illustrated as being performed centrally by the VXML server 110, the VXML process 300 may be implemented in a distributed manner, for example, on the agent terminal 160 associated with a received call, as would be apparent to a person of ordinary skill In a distributed implementation, when a call is assigned to a given agent terminal 160, the associated VXML process 300 would obtain the appropriate application page from the voiceXML application server 110 and execute the VXML page to play the appropriate prompts from the IVR script to the caller and to collect DIMF or speech recognized inputs from the caller. At the end of a given call, the VXML process 300 will either disconnect the call or request the IP PBX switch 120 to transfer the call to the appropriate call center agent or application.

As shown in FIG. 3, the VXML process 300 is initiated during step 310 upon receipt of a call to the IVR system 100. Upon receipt of a call, the VXML process 300 will obtain the appropriate IVR script during step 320. According to one aspect of the invention, the VXML process 300 will permute one or more aspects of the IVR menu during step 330, to thwart robotic attacks and increase the security of the IVR system 100. For example, as discussed further below in conjunction with FIGS. 5 through 11, the IVR menu options can be permuted or changed over time by adding additional menu options, varying the selection number associated with one or more menu options or varying one or more of the order, wording and pronunciation of the menu options.

The VXML process 300 renders the page, performs ASR and TTS services, as necessary, and returns results to the VXML applications server 110 during step 340, in a known manner.

A test is performed during step 350 to determine if the interaction with the caller is finished. For example, the final VXML page sent from the VXML applications server 110 to the VXML process 300 can instruct the VXML process 300 to terminate or transfer the call. If it is determined during step 350 that the interaction with the caller is not finished, the VXML process 300 will return to step 340 to process the remaining IVR script. If it is determined during step 350 that the interaction with the caller is finished, the VXML process 300 will request disconnection a transfer of the call during step 360.

FIG. 4 illustrates an exemplary representation of a conventional IVR tree 400 As previously indicated, the exemplary IVR tree 400 may be written as a VXML script or another voice markup language that can be applied to a parser for tendering to a user. An exemplary IVR system 100 might start a call with initial greeting 410 that is played to the called, such as the following message:

"Welcome to Fictitious Airlines.
1. Press 1 to track a current flight. [TRACK]
2. Press 2 to make a domestic reservation. [DOMESTIC]
3. Press 3 to make an international reservation. [INTERNATIONAL]
4. Press 4 for all other requests. [OTHER]
5. to hear these options again, press 5. [START]

The exemplary IVR system 100 plays the above greeting 410 and prompts the caller to select an option from a menu of five options. The caller can typically press a number associated with a desired menu option (referred to herein as a selection number) on a telephone keypad or state the selected number. It is noted that the leading number for each entry in the above list, such as the string "1" is typically not pronounced by the IVR system 100. It is further noted that the text shown in square brackets for each entry in the above list such as the string "[TRACK]", indicates a node in the IVR tree to which the IVR system will jump if the caller enters the corresponding selection option For example, if the caller response is "2," the IVR system 100 will jump to the [TRACK] node of the IVR tree The node string is typically not pronounced by the IVR system 100.

As shown in FIG. 4, if the caller enters a selection number of 1, for example, in order to track a current flight, the caller will be presented with a corresponding secondary message 420 associated with the selected tracking menu option.

The present invention recognizes that a robot that attacks this system can easily enter a fixed sequence of numbers to eventually reach a human agent and waste the time of the human agent or to access and consume another limited resource. According to various embodiments of the present invention, the IVR system 100 can randomly permute one of more of the selection numbers (to prevent against that simple attack) and the phrasing of the statements (to prevent against attacks based on speech recognition). In addition, additional menu options can optionally be added to the greeting 410. Successful navigation of a permuted system is itself evidence of humanity (because current computers are not able to process speech at the required level).

FIG. 5 illustrates an exemplary representation of a permutable IVR tree 500 incorporating features of the present invention As shown in FIG. 5, the fixed selection options from the conventional IVR menu 400 of FIG. 4 have been replaced with codes ("*") that allows the selection number associated with each menu option to be changed In the notation of FIG 5, the code "*" is replaced with a number, and then the underscore character "_" is a reference to the number. In this manner, the selection number associated with one or more options in the IVR menu can be varied over time. In the exemplary embodiment of FIG. 5, the order of the menu options is maintained, but the IVR tree 500 is permuted by varying the selection number associated with one or more options in the IVR menu 500.

FIG. 6 illustrates an exemplary representation of a permutable IVR tree 600 in accordance with a shuffling embodiment of the present invention. In the shuffling embodiment of FIG. 6, the order of at least two options in the IVR menu 600 is varied and the selection number associated with one or more options in the IVR menu 600 can optionally also be varied The shuffling of the menu options can optionally be subject to certain constraints. For example, the "hear again" menu option can be required to always be last; and the "all other requests" menu option can be required to always be second-to-last. Thus, the IVR menu 600 optionally includes a set 610 of unconstrained menu options and a set 620 of constrained menu options. The order of items in the set 620 of constrained menu options is not varied In the exemplary set 620 of constrained menu options, "*-1" denotes the last item in a list and "*-2" denotes the second-to-last item in the constrained list.

The order of the menu options in the set 610 of unconstrained menu options can be varied (or shuffled) using any well-known algorithm to shuffle an array of elements. For example, a new random key can be attached to each record, the set 610 can be sorted by the new random key and then the random key can be removed prior to presentation to the caller. See, for example, D E Knuth, The Art of Computer Programming, v. 3, Sorting and Searching, Solution 5.11, 574, Addison-Wesley, Reading, Mass., (1972).

FIG. 7 illustrates an exemplary representation of a permutable IVR tree 700 in accordance with a renumbering embodiment of the present invention. In the renumbering embodiment of FIG. 7, the selection number associated with one or more options in the IVR menu 700 is varied using a renumbering technique Instead of using a sequence of numbers 1, 2, 3, . . . in order, the renumbering technique uses another set of distinct digits An unsophisticated attacker can guess a random number, but now the selection is from a larger set. A more sophisticated attacker is now required to do automatic speech recognition (ASR) to recognize the numbers.

If the basic, unpermuted IVR menu is:
Welcome to Fictitious Airlines.
1. Press 1 to track a current flight. [TRACK]
2. Press 2 to make a domestic reservation. [DOMESTIC]
3. Press 3 to make an international reservation. [INTERNATIONAL]
4. Press 4 for all other requests. [OTHER]
5. To hear these options again, press 5. [START]

If a robot wanted to attack a human agent, the robot can enter a fixed sequence of numbers to eventually reach a human agent and waste the time of the human agent For example, to deliver a political message to a domestic agent, the robot would first press 2 (from above), and then press whatever the code happens to be in the next menu for "speak to an agent."

In one exemplary embodiment, the selection number associated with one or more menu options can change, but the basic menu order can remain intact, as follows:
Welcome to Fictitious Airlines.
7. Press 7 to track a current flight. [TRACK]
2. Press 2 to make a domestic reservation. [DOMESTIC]
6. Press 6 to make an international reservation. [INTERNATIONAL]
9. Press 9 for all other requests. [OTHER]
1. To hear these options again, press 1. [START]

Such an embodiment provides some protection, but it could still be attacked by a robot that knew it wanted to wait for the second phrase. Such a robot would ignore the first phrase (for example, as estimated by time), and then analyze each word in the second phrase The only word that sounds like a number is "2," so the robot would press 2. This technique provides some additional protection over an unpermuted menu, but perhaps not enough protection for certain applications.

In a renumbering embodiment of the present invention, both the selection numbers associated with one or more menu options and the order in which the menu options appear can be varied. As indicated above, the reordering of options can optionally be constrained, for example, such that the "for all other requests" option is second-to-last, and the "to hear again" option is last, as follows:
Welcome to Fictitious Airlines
* Press_to make an international reservation. [INTERNATIONAL]
* Press_to make a domestic reservation. [DOMESTIC]
* Press_to track a current flight. [TRACK]
*-2 Press_for all other requests. [OTHER]
*-1 To hear these options again, press_. [START]

As indicated above, "*" denotes a place-holder for a number, and the "_" refers to the number.

When the VXML process 300 manipulates that node of the IVR tree, it randomly shuffles the first three items in the unconstrained list, and leaves the last two items in order. The VXML process 300 then assigns random number s between 1 and 10, for example, without using duplicates The result might look like this:
Welcome to Fictitious Airlines.
4 Press to make an international reservation. [INTERNATIONAL]
7 Press_to make a domestic reservation. [DOMESTIC]
1 Press_to track a current flight. [TRACK]
9 Press_for all other requests. [OTHER]
2 To hear these options again, press_. [START]

The above menu is now hard for a robot to attack. The only chance that a robot might have is to look for a key phrase such as "to make a domestic reservation." As discussed further below, additional permutations can make the ASR detection of a key phrase more difficult, such as varying the phrasing or pronunciation (or both) of one or more menu options.

FIG. 8 illustrates an exemplary catalog 800 of additional menu options for a permutable IVR tree in accordance with the present invention. The catalog 800 allows one or more additional menu options to be added to a basic IVR menu. In this manner, the complexity of the IVR tree is increased and there are additional "dead ends" or invalid options to confuse robots. In an exemplary embodiment, a basic IVR menu can be extended by selecting one or more additional menu options randomly from the stock catalog 800 of choices. As shown in FIG. 8, the catalog 800 optionally includes a first set 810 of business-related additional options and second set 820 of other additional options The set of options in the catalog can be based on the application associated with the IVR system 100.

FIG. 9 illustrates an exemplary catalog 900 of alternate phrases for one or more menu options for a permutable IVR tree in accordance with an "alternate phrasing" embodiment of the present invention. For a given menu option, the VXML script can direct the VXML process 300 to randomly select from one of several phrasings in the catalog 900. In this manner, the complexity of the ASR process required for successful traversal of the menu to a live agent is increased.

In a further variation of the "alternate phrasing" embodiment of the present invention, "context free grammars" can be employed to dynamically generate sentences. See, for example, A. V. Aho et al, "The Awk Programming Language," Section 5.1, 113, Addison-Wesley (1988). FIG. 10 illustrates an exemplary grammar for such dynamic generation of sentences by the alternate phrasing embodiment of FIG. 9.

In yet another variation of the present invention, a given IVR menu can be permuted by changing the pronunciation of one or more menu options. For example, the VXML process 300 can implement a random pronunciation embodiment of the present invention by randomly selecting one or more of the speaker's gender, rate of speech, volume and pitch. See, for example, Avaya Intuity Conversant "Proxy Text-to-Speech," support. avaya.com/edoc/docs/convinst/ cnvptts2pdf at page 31. In this manner, the complexity of the ASR process required for successful traversal of the menu to a live agent is increased.

The present invention recognizes that while individual embodiments provide some protection that may be sufficient fox many applications, additional security and protection can be obtained by integrating a plurality of embodiments in a single implementation. FIG. 11 illustrates an exemplary outline for an integrated embodiment of the present invention that incorporates several of the embodiments discussed above in conjunction with FIGS. 9, 8, 6, 7, as well as the random pronunciation embodiment (not shown in a figure).

Security Quantification

The above discussion has considered permuting IVR trees only as a mechanism for making it more difficult for phone robots to gain access to limited resources, such as customer service representatives or financial accounts. According to a further aspect of the present invention, the permuted trees can be analyzed to quantify the probability of a certain class of attacker gaining entrance in their presence (by considering the mechanism against a member of a certain specified class of attackers).

For example, consider a node in an IVR tree with three "real" choices: A, B and C encoded with selection options as 1, 2 and 3. With no permuting, an attacker can take the proper choice every time. Suppose now that random digits are assigned to each of the various choices An attacker can guess a random digit as a probability of 1/10 (or $10^{-1}$) of making the correct choice. Thus, the attacker has a probability of 3/10 of selecting one of the three "real" choices.

Consider now an attacker that can perform automatic speech recognition (ASR) to pick out digits with 100% accuracy. That attacker now has a 1/3 chance of selecting the "right" choice, but a 100% chance of selecting one of the three "real" choices. That is the motivation for adding one or more gratuitous branches at a node, such as "Press 7 to hear a duck quack" or "To take a customer satisfaction survey, press 4 now." If three such "attractive nuisance" options are added to the three real choices, the attacker with digit ASR now has a probability of 1/6 of making the right choice, and only 1/2 of making one of the three "real" choices.

This analysis can be extended to establish a probability of a certain class of attacker getting to any particular point in the IVR tree. This analysis can be used to tune a system. The tradeoff between the effectiveness of a permuted tree in keeping out attackers and the hassle it induces for real users can thus be quantified.

For more complicated models of attackers, such as attackers having an ASR capability that hunts for digits and also for key phrases, such as "domestic flights" and "continental US" and "lower 48," if the attacker hopes to bother a human agent who is booking flights that ate not international.

Permuted IVR trees can be used to estimate a frequency of attack. The permuted trees of the present invention can be used in "peace time" when the system is known not to be under attack, and statistics can be gathered to observe how often humans fail to navigate the modified trees (either by pressing wrong numbers or by visiting unlikely nodes) In "war conditions," when permuted trees are deployed, how often the various nodes ale visited can be counted. The peacetime statistics can then be used to estimate how many unlikely nodes ate quirky humans as opposed to robots, and how many agents speak to lucky robots.

While the figures herein show an exemplary sequence of steps, it is also an embodiment of the present invention that the sequence may be varied. Various permutations of the algorithms are contemplated as alternate embodiments of the invention.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e g., a network comprising fiber-optics, the world-wide web, cables, or a wireless channel using time-division multiple access, code-division multiple access, or other radio-frequency channel) Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular The memories could be implemented as an electrical, magnetic ox optical memory, or any combination of these or other types of storage devices Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
receiving, by a system, a call from a caller;
in response to receiving the call, obtaining, by the system, a menu that includes a first menu option and a second menu option, wherein each menu option has a fixed position within the menu based on a selection number;
permuting, by the system, the selection number of the first menu option and the second menu option without changing the fixed position of the first menu option and the second menu option, wherein the step of permuting comprises renumbering the selection number of the first menu option and the second menu option with a first randomly generated number and a second randomly generated number, respectively; and
presenting, by the system, the first menu option with the second menu option to the caller after permuting.

2. The method of claim 1, wherein the step of permuting further comprises adding a third menu option to the menu.

3. The method of claim 2, wherein the third menu option is obtained from a library of menu options.

4. The method of claim 1, wherein the step of permuting further comprises varying a wording of the first menu option.

5. The method of claim 4, wherein the step of varying the wording of the first menu option further comprises dynamically generating the wording.

6. The method of claim 1, wherein the step of permuting further comprises varying a pronunciation of the first menu option.

7. The method of claim 6, wherein the step of varying the pronunciation further comprises varying one or more of a gender, rate of speech, volume, and pitch of the first menu option.

8. The method of claim 1, wherein the method is performed when, and only when, one or more predefined criteria defining an attack are satisfied.

9. The method of claim 1, further comprising quantifying a security level provided by the method.

10. A method comprising:
    receiving, by a system, a call from a caller;
    in response to receiving the call, obtaining a menu that includes a first menu option and a second menu option by the system;
    permuting, by the system, the first menu option and the second menu option, wherein the step of permuting comprises:
    (i) randomly generating, by the system, a first selection number and a second selection number,
    (ii) renumbering, by the system, the first menu option and the second menu option using the first selection number and the second selection number, respectively, and
    (iii) randomly shuffling, by the system, the first menu option and the second menu option; and
    presenting, by the system, the first menu option and the second menu option to the caller after permuting.

11. The method of claim 10, wherein the permutation adds a third menu option to the menu.

12. The method of claim 11, wherein the third menu option is obtained from a library of menu options.

13. The method of claim 10, wherein the method is performed when, and only when, one or more predefined criteria defining an attack are satisfied.

14. The method of claim 10, further comprising quantifying a security level provided by the method.

15. The method of claim 10, wherein the permutation varies a wording of the first menu option.

16. The method of claim 10, wherein the permutation varies a pronunciation of the first menu option.

17. The method of claim 16, wherein the pronunciation variation varies one or more of a gender, rate of speech, volume, and pitch of the first menu option.

* * * * *